US011614397B2

(12) United States Patent
Ichihara et al.

(10) Patent No.: US 11,614,397 B2
(45) Date of Patent: Mar. 28, 2023

(54) IDENTIFICATION APPARATUS AND IDENTIFICATION METHOD

(71) Applicant: CANON KABUSHIKI KAISHA, Tokyo (JP)

(72) Inventors: Shigeru Ichihara, Tokyo (JP); Yuki Yonetani, Kanagawa (JP); Makoto Kawaguchi, Kanagawa (JP); Yasuhisa Shigehara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/340,539

(22) Filed: Jun. 7, 2021

(65) Prior Publication Data

US 2021/0404947 A1    Dec. 30, 2021

(30) Foreign Application Priority Data

Jun. 25, 2020    (JP) .............................. JP2020-109438

(51) Int. Cl.
| | | |
|---|---|---|
| *G01J 3/44* | (2006.01) | |
| *G01N 21/17* | (2006.01) | |
| *G01N 21/65* | (2006.01) | |
| *G01N 21/03* | (2006.01) | |
| *G01N 21/84* | (2006.01) | |

(52) U.S. Cl.
CPC ............. *G01N 21/17* (2013.01); *G01N 21/03* (2013.01); *G01N 21/65* (2013.01); *G01N 21/84* (2013.01); *G01N 2021/0389* (2013.01); *G01N 2021/1765* (2013.01); *G01N 2021/845* (2013.01)

(58) Field of Classification Search
CPC ........ G01J 3/44; G01J 3/02; G01J 3/28; G01J 3/14; G01J 3/18; G01N 21/17; G01N 21/03; G01N 21/65; G01N 21/84; G01N 2021/0389; G01N 2021/1765; G01N 2021/845; B07C 5/342; B07C 5/366

See application file for complete search history.

(56) References Cited

U.S. PATENT DOCUMENTS

| | | | | |
|---|---|---|---|---|
| 6,313,423 | B1 * | 11/2001 | Sommer | ................. B07C 5/366 |
| | | | | 209/579 |
| 9,877,655 | B2 * | 1/2018 | Huang | .................... G02B 23/26 |
| 2007/0070342 | A1 * | 3/2007 | Treado | ....................... G01J 3/44 |
| | | | | 356/38 |
| 2009/0066934 | A1 * | 3/2009 | Gao | ..................... G01N 1/2273 |
| | | | | 356/417 |

FOREIGN PATENT DOCUMENTS

| | | |
|---|---|---|
| JP | H11197609 A | 7/1999 |
| JP | 2002323450 A | 11/2002 |

* cited by examiner

*Primary Examiner* — Abdullahi Nur
(74) *Attorney, Agent, or Firm* — Canon U.S.A., Inc. IP Division

(57) ABSTRACT

An identification apparatus includes a window unit including a passage surface on an upper side configured to allow a sample supplied from a conveyance unit to slide along and pass on the passage surface, a light irradiation unit disposed below the window unit, spaced a certain distance from the passage surface, and configured to irradiate the sample with a primary light through the window unit, a light collection unit disposed below the window unit and configured to collect a secondary light from the sample through the window unit, and an acquisition unit configured to acquire identification information for identifying a property of the sample based on the secondary light collected by the light collection unit.

22 Claims, 5 Drawing Sheets

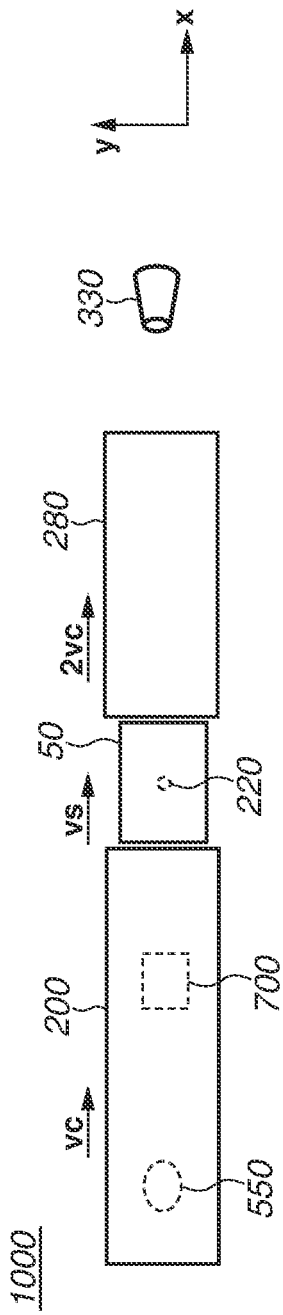
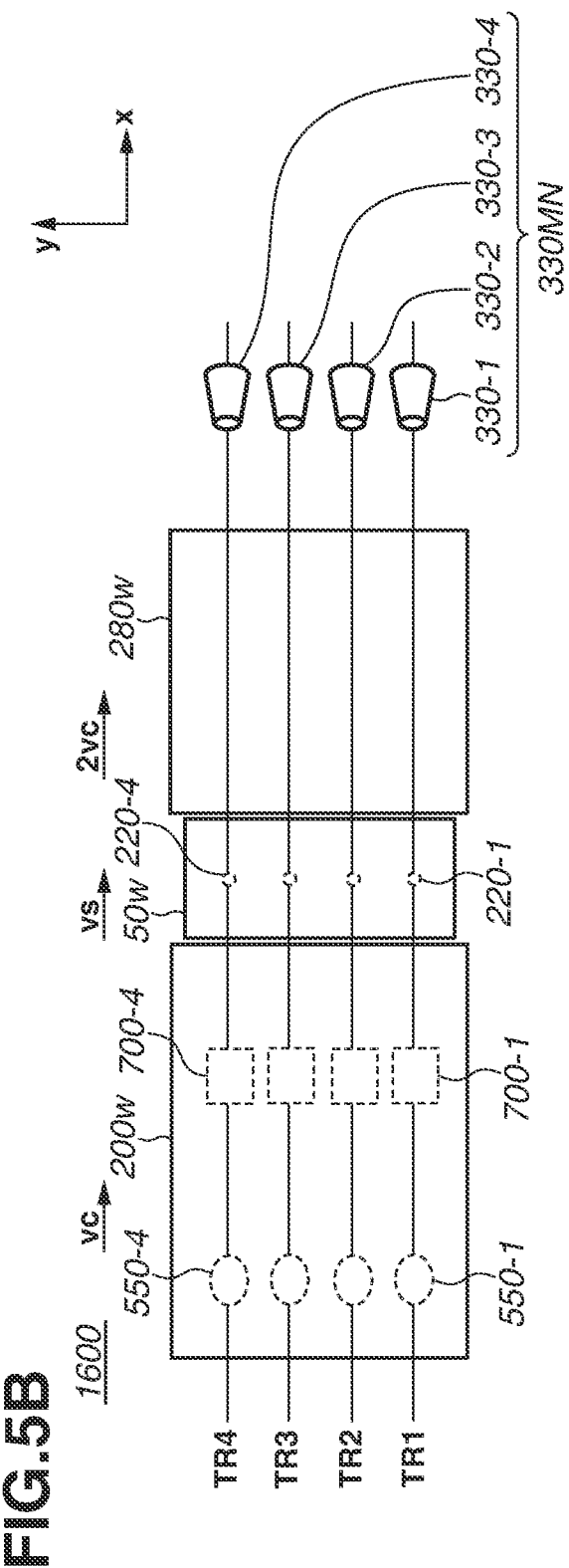

IDENTIFICATION APPARATUS AND IDENTIFICATION METHOD

BACKGROUND

Field of the Disclosure

The present disclosure relates to an identification apparatus that identifies the property of a sample and a method for identifying the property of a sample.

Description of the Related Art

An identification apparatus is known to optically identify the property of a sample by using spectroscopy. Such an identification apparatus is disposed in the middle of a conveyance path where samples are conveyed, and is utilized for product inspection, waste segregation, and other purposes. Spectroscopy enables identification of the property of a sample under atmosphere without requiring a vacuum decompression process, an atmosphere control process, a process of immersion into liquid, and an atmosphere management process related to a drying process, which all limit the analytical throughput. For this reason, spectroscopy has recently been applied to waste resin segregation on a tentative basis.

Spectroscopy is known to include absorption spectroscopy for acquiring an absorption spectrum of a sample for incident light, and scattering spectroscopy for acquiring a scattering spectrum of a sample for incident light. Scattering spectroscopy is hardly affected by the optical attenuation in the thickness direction of a sample, and therefore is used for waste identification where there are variations in size and contained material of samples. Raman scattering spectroscopy for spectrally diffracting the Raman scattered light uses a Raman shift specific to the interatomic bond configuring hydrocarbon, and therefore is preferable for resin identification.

An assorting apparatus is known to assort identified samples based on whether the property of each sample satisfies a certain target condition. Japanese Patent Application Laid-Open No. 11-197609 discusses a waste bottle assorting apparatus including a conveyance unit for conveying waste bottles arranged in line in the conveyance direction, a camera for capturing images of waste bottles being conveyed, an image processing apparatus for estimating the center of gravity, and a valve drive apparatus for spraying compressed air to waste bottles. The assorting apparatus discussed in Japanese Patent Application Laid-Open No. 11-197609 identifies the type and the center of gravity of waste bottles based on colors and sizes of waste bottles acquired from camera images, and discharges compressed air toward the center of gravity of waste bottles for segregation.

The Raman scattered light used by Raman scattering spectroscopy provides a lower intensity by several orders than elastic scattering components (Rayleigh diffuse light) contained in secondary light. Thus, there is employed a technique for irradiating a sample with condensed primary light to increase the detection sensitivity per unit area. A light condensing method can obtain an effect of increasing the detection sensitivity. However, in this method, the intensity of detection light varies according to variations in the working distance between a light irradiation unit and an irradiation surface (detection surface), resulting in variations in the identification performance. To alleviate variations in the detection light intensity and the identification performance, it is demanded that a constant working distance is maintained in scattering spectroscopy.

Japanese Patent Application Laid-Open No. 2002-323450 discusses an identification apparatus including a conveyance unit for conveying samples arranged in line, and an identification unit for identifying the material of samples based on scattered light of samples being conveyed. The identification apparatus is provided with a reference surface for maintaining a constant distance between a sample and a light detecting element to provide high-accuracy identification performance.

Japanese Patent Application Laid-Open No. 2002-323450 discusses identification apparatuses according to two different exemplary embodiments. These apparatuses are different in a method for maintaining a constant distance between a sample and a light irradiation unit, i.e., a constant working distance.

According to the reference, a plurality of slits is provided at certain intervals in the conveyance direction of the conveyor belt. In this slit form, scattered light from a plurality of samples arranged in line along the slots is sequentially received through the slots, thus recognizing the working distance as a certain value. In addition, the reference teaches a guide for pressing a sample in the sub conveyance direction of the conveyor belt, and a light transmitting plate subjected to the pressing are provided. In this guide form, scattered light from samples that are pressed against the light transmitting plate is received through the light transmitting plate, thus recognizing the working distance as a certain value. Furthermore, a sample is pressed against the light transmitting plate by using a guide portion having a curved shape inclined with respect to the conveyance and the sub conveyance directions.

In a slit form in which a plurality of slits is provided on the conveyor belt, discussed in Japanese Patent Application Laid-Open No. 2002-323450, a mechanism for positioning samples to the slits in the conveyance direction is required. Thus, there has been a concern that an apparatus is complicated and the number of samples to be inspected per unit time is limited by the slit interval. In the slit form, there has been a concern that the slits limit the light amount to degrade the detection sensitivity or that a sample is caught by a slit or drops therein when slits are enlarged.

In the guide form discussed in Japanese Patent Application Laid-Open No. 2002-323450, the inclined guide portion presses a sample against the light transmitting plate. For this reason, there has been a concern that the detection surface of a sample is inclined with respect to the light transmitting plate or that a sample is caught by the guide or the light transmitting plate, thus limiting the number of samples to be identified and processed.

SUMMARY

The present disclosure is directed to providing an identification apparatus or an identification method that hardly reduces the number of samples to be inspected and processed, and hardly degrades the identification accuracy by stabilizing the distance (working distance) between the light detection surface and the light irradiation unit, even if there are variations in size and shape of conveyed samples. More specifically, the present disclosure is directed to providing an identification apparatus or an identification method that hardly reduces the number of samples to be inspected and processed, and hardly degrades the identification accuracy by reducing variations in the distance between the light detection surface and the light irradiation unit, even if there are variations in size and shape of conveyed samples.

An identification apparatus includes a window unit including a passage surface on an upper side configured to allow a sample supplied from a conveyance unit to slide along and pass on the passage surface, spaced a certain distance from the passage surface, and configured to irradiate the sample with a primary light through the window unit, a light collection unit disposed below the window unit and configured to collect a secondary light from the sample through the window unit, and an acquisition unit configured to acquire identification information for identifying a property of the sample based on the secondary light collected by the light collection unit.

An identification method includes passing a sample carried out from a conveyance unit on a passage surface on an upper side of a window unit and sliding the sample in contact with the passage surface, irradiating, through the window unit, the sample with primary light from a light irradiation unit disposed below the window unit, collecting secondary light from the sample through the window unit, and identifying the property of the sample based on the collected light.

Further features of the present disclosure will become apparent from the following description of exemplary embodiments with reference to the attached drawings.

BRIEF DESCRIPTION OF THE DRAWINGS

FIG. 5A schematically illustrates a configuration of an identification apparatus according to the first exemplary embodiment of the subject disclosure, and FIG. 5B schematically illustrates a configuration of an identification apparatus according to a fourth exemplary embodiment of the subject disclosure.

DESCRIPTION OF THE EMBODIMENTS

Exemplary embodiments of the present disclosure will be described below with reference to the accompanying drawings.

Figure 1:
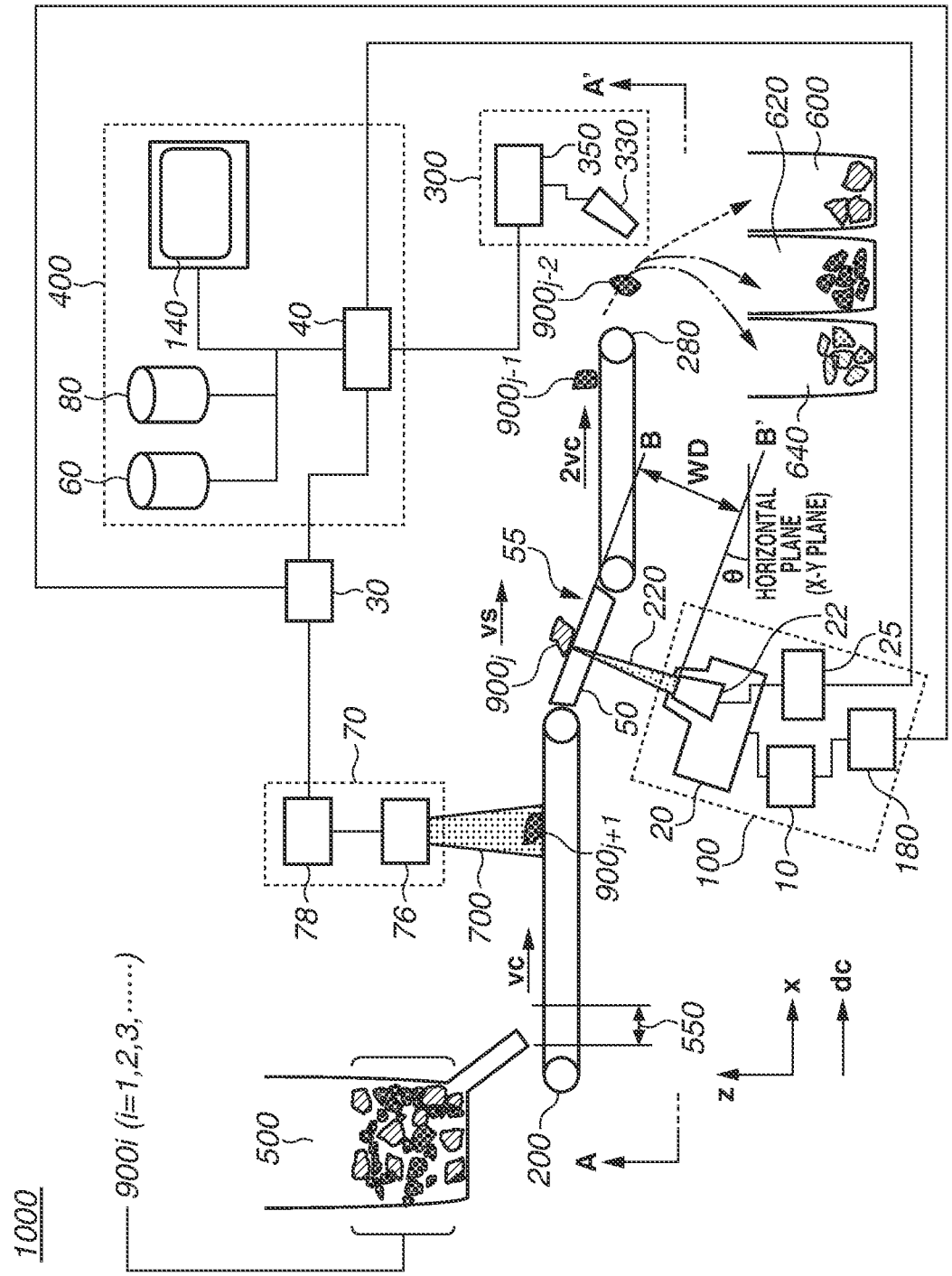
FIG. 1 schematically illustrates a configuration of an identification apparatus according to a first exemplary embodiment of the subject disclosure.

A first exemplary embodiment of the present disclosure will be described below. An identification apparatus according to the present exemplary embodiment will be described below with reference to FIGS. 1, 2, and 5A. FIG. 1 schematically illustrates a configuration of an identification apparatus 1000 according to the present exemplary embodiment. FIG. 5A is a plan view illustrating conveyance units 200 and 280, a window unit 50, and an air nozzle 330 of the identification apparatus 1000 when viewed in the z direction from the plane A-A' illustrated in FIG. 1.

(Identification Apparatus)

The identification apparatus 1000 includes a window unit 50 having, on the upper side thereof, a passage surface 55 where a sample 900$i$ carried out from the conveyance unit 200 passes on the passage surface 55 while in contact therewith, a light irradiation unit 22 for irradiating the sample 900$i$ with the primary light through the window unit 50, and a light collection unit 20 for collecting the secondary light from the sample 900$i$ through the window unit 50. The identification apparatus 1000 further includes an acquisition unit 30 for identifying the property of the sample 900$i$ based on the light collected by the light collection unit 20, and an instruction unit 40 for generating a control signal for controlling the discrimination operation of a discrimination apparatus 300 based on the property of the identified sample 900$i$.

As illustrated in FIGS. 1 and 5A, the identification apparatus 1000 includes the feeder side conveyance unit 200 disposed on the upstream side of the window unit 50 to convey the sample 900$i$ in the x direction at the conveyance speed vc, the sorter side conveyance unit 280 disposed on the downstream side of the window unit 50 to convey the sample 900$i$ in the x direction at the conveyance speed 2$vc$, and a discrimination apparatus 300 on the downstream side of the sorter side conveyance unit 280.

(Spectral Information Acquisition Unit)

The identification apparatus 1000 includes a spectral information acquisition unit 100 for acquiring spectral information about light collected from the sample 900$i$ through the window unit 50. The spectral information acquisition unit 100 acquires a Raman shift based on a difference in the wavenumber between the Raman scattered light contained in the secondary light from the sample 900$i$ and excited light contained in the primary light.

Figure 2:
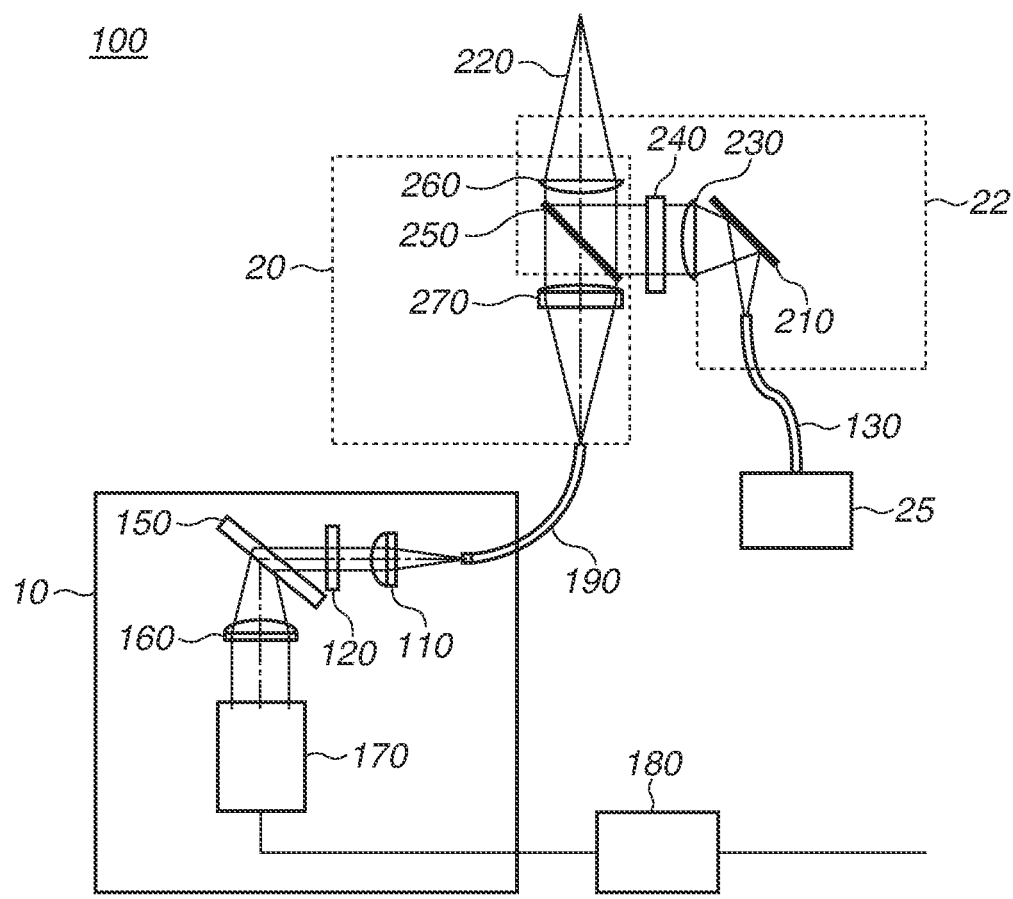
FIG. 2 schematically illustrates a configuration of a spectral information acquisition unit according to the first exemplary embodiment of the subject disclosure.

As illustrated in FIG. 1, the spectral information acquisition unit 100 includes the light irradiation unit 22 for irradiating the sample 900$i$ with primary light 220 through the window unit 50, and the light collection unit 20 for collecting the secondary light from the sample 900$i$ through the window unit 50. As illustrated in FIG. 2, the light irradiation unit 22 and the light collection unit 20 according to the present exemplary embodiment are coaxially disposed, and the light irradiation unit 22 is optically coupled to a light source 25 (hereinafter, also referred to as laser source or semiconductor laser) including a laser light source, via an optical fiber 130. The light collection unit 20 is optically coupled to a spectral image acquisition unit 10 via an optical fiber 190 to enable the acquisition unit 30 to acquire optical information that reflects materials contained in the sample 900$i$.

FIG. 2 schematically illustrates an example of a configuration of the spectral information acquisition unit 100. The spectral information acquisition unit 100 includes the light irradiation unit 22 for irradiating the sample 900$i$ with light, and the light collection unit 20 for collecting the Raman scattered light from the sample 900$i$. The light irradiation unit 22 and the light collection unit 20 are coaxially arranged on the sample side (object side) viewed from the dichroic mirror. Even if the irradiation surface of the sample 900$i$ is uneven in height or inclined, a positional deviation is prevented between the center of the irradiation spot and the center of the scattered light flux.

(Irradiation Unit)

The light irradiation unit 22 is disposed below the window unit 50 to irradiate the bottom surface of the sample 900$i$ passing on the passage surface 55 on the upper side of the window unit 50 with the primary light through the window unit 50. The light irradiation unit 22 is disposed below the window unit 50 to irradiate the down-facing surface of the sample 900$i$ passing on the passage surface 55 which is the upper side of the window unit 50 with the primary light through the window unit 50. The light irradiation unit 22 is disposed to converge irradiation light 202 (hereinafter, also referred to as primary light 202) toward the passage surface 55 in contact with the down-facing surface of the sample 900i. This arrangement provides a higher scattering intensity of Raman scattered light, which feebler than the Rayleigh scattered light by several orders. The unit including the light irradiation unit 22 and the light source 25 may be referred to as an irradiation optical system.

As illustrated in FIG. 2, the light irradiation unit 22 includes an objective lens 260, a dichroic mirror 250, a collimating lens 230, a cylindrical lens 240, and a reflecting mirror 210. The employed objective lens 260 is a convex lens, a collimating lens, a concave lens, or a zoom lens.

Synthetic quartz can be used as the glass material of the collimating lens 230, the cylindrical lens 240, and the objective lens 260. These lenses are irradiated with high power light from semiconductor laser 25. Using lenses made of synthetic quartz as the glass material enables reducing background components containing fluorescence light and the Raman scattered light.

In the light irradiation unit 22, the objective lens 260 acts as a condenser lens for condensing the light from the laser light source 25 to the sample 900i. The collimator lens 230 and the cylindrical lens 240 reduce the scattering of the outgoing light of the laser light source 25 to shape the light into parallel light. The cylindrical lens 240 may be other collimating optical elements, such as an anamorphic prism pair. In the light irradiation unit 22, a wavelength filter, such as a laser line filter, may be disposed at the position of the pupil surface. This arrangement enables improving the wavelength characteristics of the light with which the sample 900i is irradiated by the light irradiation unit 22.

At least a part of the light irradiation unit 22 can be shared with the light collection unit 20. Since the light collection unit 20 and the light irradiation unit 22 according to the present exemplary embodiment are coaxially arranged, the objective lens 260 and the dichroic mirror 250 are shared by the light collection unit 20 and the light irradiation unit 22.

As illustrated in FIG. 1, the light irradiation unit 22 is disposed apart from the passage surface 55 of the window unit 50 by a certain distance, i.e., a certain working distance WD. In other words, the light irradiation unit 22 is spaced a certain working distance WD from the passage surface 55 of the window unit 5. Such an optical system arrangement of back irradiation reduces variations in the spot diameter of the radiation light 202 on the light irradiation surface of the sample 900i and variations in the Raman scattering light intensity even with variations in size of the sample 900i. More specifically, the light irradiation unit 22 disposed below the window unit 50, apart from the passage surface 55 by the working distance WD, is referred to as a means for performing a process of irradiating the sample 900i with primary light 202. The certain working distance WD is determined in consideration of the light collection effect of the light irradiation unit 22 and the thickness of the window unit 50. More specifically, a working distance WD from 2 to 50 mm inclusive is employed.

For the sake of understandability, FIG. 1 illustrates the working distance WD as the distance between the auxiliary parallel lines B and B' which is shifted, in the lower right direction, from the positions of the passage surface 55 and the light irradiation unit 22 with the positional relation between the passage surface 55 and the light irradiation unit 22 maintained.

(Light Source)

The light source 25 emits excited light to the light irradiation unit 22 via the optical fiber 130. In the irradiation optical system for spectrally dispersing the Raman scattered light, the light source 25 is a laser light source having a wavelength of 400 to 1100 nm. For the Raman scattering, the excitation efficiency increases with decreasing wavelength, and background fluorescence components decrease with increasing wavelength.

It is preferable to select the excitation wavelength of the laser light source applied to the light source 25 so that the difference in the Raman shift can be definitely obtained between the target and non-target materials. At least one of wavelengths 532, 633, and 780 nm may be used. Although, in the above-described case, the semiconductor laser 25 is used as the light source 25 of the light irradiation unit 22, the present disclosure is not limited thereto. Other laser light sources, such as a semiconductor excitation solid state laser and a gas laser, are also applicable.

(Light Collection Unit)

The light collection unit 20 is disposed below the window unit 50 to collect, through the window unit 50, the secondary light from the bottom surface of the sample 900i passing on the passage surface 55 on the upper side of the window unit 50. In other words, the light collection unit 20 is disposed below the window unit 50 to collect the secondary light from the down-facing surface of the sample 900i passing through the window unit 50, facing the passage surface 55. The light collection unit 20 is referred to as a means for performing a process of collecting the secondary light from the sample 900i through the window unit 50.

The light collection unit 20 includes the objective lens 260, the dichroic mirror 250, an imaging lens 270, and the optical fiber 190. The objective lens 260 of the light collection unit 20 includes a convex lens, a collimating lens, a concave lens, and a zoom lens, as in the light irradiation unit 22. To attenuate unnecessary light in spectroscopic measurement, the light collection unit 20 may be provided with a wavelength filter that reduces excited light components contained in the primary light, such as a band-pass filter or a long-pass filter.

The light collection unit 20 includes the objective lens 260 having a large numerical aperture to ensure a sufficient light collection efficiency. The employed numerical aperture of the objective lens 260 of the light collection unit 20 is 0.25 to 0.5 inclusive. More specifically, B-270 having an effective lens diameter of φ25 mm, a focal distance of 20 mm, and a numerical aperture of 0.5 from SCHOTT AG is applicable as the objective lens 260.

(Spectral Image Acquisition Unit)

As illustrated in FIG. 2, the spectral image acquisition unit 10 includes an imaging lens 110, a long-pass filter 120, a spectral element 150, and an imaging device 170 sequentially disposed from the side of the light collection unit 20. The spectral element 150 and the imaging device 170 are disposed to spectrally disperse the light collected by the light collection unit 20 and project a continuous spectrum along the row or column direction of the array of light receiving elements of the imaging device 170, via the imaging lens 160. The employed imaging device 170 is a charge coupled device (CCD) sensor or a complementary metal oxide semiconductor (CMOS) sensor having a one- or two-dimensional array of light receiving elements. The spectral element 150 may be referred to as a diffraction grating.

The imaging lens 110 converts the light transmitted from the light collection unit 20 via the optical fiber 190 into parallel light. The long-pass filter 120 attenuates excited light components contained in the collected light and transmits the Raman scattered light therethrough. The spectral element 150 spectrally disperses the collected light to scatter wavelength components in fan-like fashion. The imaging lens 160 reflects the light spectrally dispersed by the spectral element 150 onto the imaging device 170. The spectral element 150 employs the Rowland arrangement or the Czerny-Turner method.

The imaging device 170 acquires spectral information Si for the sample 900i in consideration of a captured spectral image, the photoelectric conversion characteristics of the image sensor included in the imaging device 170, and the transmission characteristics of the optical system.

(Material Information Reference Unit)

The spectral information acquisition unit 100 includes a material information reference unit 180 for acquiring material information for the sample 900i based on the spectral information Si acquired by the spectral image acquisition unit 10. The material information reference unit 180 references a material database (not illustrated) that records reference data of the Raman scattered light, and acquires material information Mi in which materials included in the sample 900i are identified based on the similarity between the spectral information Si and the reference data. The spectral information acquisition unit 100 stores at least one of the spectral information Si and the material information Mi in a first storage unit 60 via the instruction unit 40 (described below).

The material database referenced by the material information reference unit 180 may be recorded in a local server included in the identification apparatus 1000 or in a remote server that can be accessed via the Internet or an intranet.

The spectral information acquisition unit 100 can acquire the material information Mi about materials, additives, impurity components, and their mixtures contained in the sample 900i.

(Form Information Acquisition Unit)

As illustrated in FIGS. 1 and 5A, a form information acquisition unit 70 includes a camera 76 disposed so that an imaging field 700 overlaps with the conveyance unit 200, and an image processing unit 78 for subjecting an image of the sample captured by the camera 76 to image processing. The form information acquisition unit 70 acquires form information Fi for the sample 900i. As with the material information Mi, the form information Fi relates to the property of the sample 900i.

The image processing unit 78 subjects the image of the sample to image processing including contrast adjustment and outline extraction to acquire the length, reflected colors, shape, and material mixing degree for each sample 900i in the conveyance direction. The image processing unit 78 may be referred to as an element that performs processing of acquiring information about the size of each sample 900i. The form information acquisition unit 70 can be provided with a photo-interrupter and a laser interferometer instead of the camera 76. The form information acquisition unit 70 may be referred to as an imaging unit.

(Acquisition Unit)

The acquisition unit 30 acquires identification information Di indicating target sample or non-target sample, for each sample 900i based on the material information Mi or the spectral information Si acquired by the spectral information acquisition unit 100 and the form information Fi acquired by the form information acquisition unit 70. The acquisition unit 30 outputs the acquired identification information Di to the instruction unit 40. A non-target sample is identified as a sample having a low content of the target material. The acquisition unit 30 is able to apply additional identification information Di based on the content of a second target material.

In other words, the acquisition unit 30 identifies the property of the sample 900i based on the Raman spectrum contained in the secondary light collected by the light collection unit 20. In other words, the acquisition unit 30 according to the present exemplary embodiment identifies the property for each sample 900i based on an image of the sample acquired from the camera 76 and the Raman spectrum contained in the secondary light collected by the light collection unit 20. In other words, the acquisition unit 30 is means for performing a process of identifying the property of the sample 900i based on the light collected by the light collection unit 20.

A modification is possible where the spectral information acquisition unit 100 and the form information acquisition unit 70 according to the present exemplary embodiment are replaced with a hyper spectrum camera or a multi-band camera capable of acquiring form information and spectral information from a captured image. More specifically, an identification apparatus according to the modification is provided with a detection system for acquiring multi-dimensional data from which material information and form information can be read.

(Control Unit)

The identification apparatus 1000 includes a control unit 400 that includes the instruction unit 40 for controlling the discrimination operation of the discrimination apparatus 300 based on the property for each sample 900i, a second storage unit 80 for storing control conditions for the discrimination operation, and the first storage unit 60 for storing the property for each sample 900i. The control unit 400 includes a display unit 140 for offering a graphical user interface (GUI) that enables the user to specify control conditions. The display unit 140 may display information acquired by the acquisition unit 30.

(Storage Units)

The first storage unit 60 is configured to store, for each sample 900i, the identification information Di, the material information Mi, the spectral information Si, and the form information Fi in association with timing tp when the sample 900i has passed on an irradiation area 220.

By contrast, the second storage unit 80 is configured to store, for each sample 900i, control conditions for controlling an intensity Is of the discrimination operation of the discrimination apparatus 300, corresponding to the identification information Di. The control conditions include referable tables, algebraically expressed general formulas, and formats such as statistical information that has been subjected to machine learning.

(Instruction Unit)

The instruction unit 40 estimates the processing region passage time tp when the sample 900i passes on the area where the sample 900i is subjected to the discrimination processing by the discrimination apparatus 300 based on the material and size for each sample 900i depending on the identification information Di from the acquisition unit 30, and generates an instruction for controlling the discrimination operation of the discrimination apparatus 300. The processing region passage time tp of the sample 900i can be estimated based on at least one of the signal from the form information acquisition unit 70, the signal from the spectral information acquisition unit 100, and the signal from a sample sensor (not illustrated) provided in the conveyance unit 280.

(Discrimination Apparatus)

As illustrated in FIGS. 1 and 5A, the discrimination apparatus 300 includes the air nozzle 330 for discharging compressed air in certain discharge time at a certain discharge speed and a certain discharge flow rate, and a discrimination control unit 350 for controlling solenoid valves (not illustrated) included in the air nozzle 330. The discrimination control unit 350 receives a control signal from the instruction unit 40 of the identification apparatus 1000. The discrimination operation of the discrimination apparatus 300 according to the present exemplary embodiment includes the operation of discharging fluid. The fluid discharged in the discharge operation contains air, dry nitrogen, inert gas, such as rare gas, liquid, and gas-liquid mixing fluid (aerosol). The discrimination apparatus 300 collects the samples 900$i$ in a target recovery cage 620 and non-target recovery cages A600 and B640 according to the property of the sample 900$i$, based on the control signal output from the instruction unit 40.

In the discrimination apparatus 300, the discharge apparatus for discharging fluid can be replaced with a flap gate that opens and closes at a certain angular speed or a shutter that opens and closes at a certain speed. The form information acquisition unit 70, the spectral information acquisition unit 100, the discrimination apparatus 300, and their components included in the identification apparatus 1000 are disposed in parallel at different positions in the sub conveyance direction of the conveyance units 200 and 280, thus increasing the integration degree and processing speed of the system.

(Conveyance Units)

The conveyance unit 200 conveys a plurality of samples 900$i$ (i=1, 2, . . . ) sequentially supplied from a feeder 500 in a conveyance direction dc (the x direction illustrated in FIG. 1) at a certain conveyance speed vc. The conveyance unit 200, together with the window unit 50 and the conveyance unit 280 (described below), configures a conveying unit for conveying the sample 900$i$ in this order.

The conveyance unit 200 according to the present exemplary embodiment is provided with a conveyor belt for linearly conveying the sample 900$i$ in the conveyance direction dc at a conveyance speed vc. As a modification, the conveyance unit 200 can be replaced with a turn table feeder for conveying samples in an eddy form, a vibration feeder having a shaker for moving in a certain direction, or a conveyor roller having a plurality of rollers.

The conveyance unit 200 moves the sample 900$i$ so that the sample 900$i$ passes through the imaging field 700 of the camera 76, and thus may also be referred to as a mounting unit 200 with respect to the form information acquisition unit 70. The conveyance unit 200 is disposed on the upstream side of the conveying unit, and thus may be referred to as a feeder side conveyance unit or a primary conveyance unit. The conveyance unit 200 carries out the sample 900$i$ to the window unit 50, and thus may also be referred to as a feeder for the window unit 50.

The conveyance unit 280 is a conveying unit for conveying the sample 900$i$ carried out from the window unit 50 (described below) to the discrimination apparatus 300. The conveyance unit 280 is disposed on the downstream side of the conveying unit, and thus may be referred to as a sorter side conveyance unit or a secondary conveyance unit.

To prevent the orientation of the sample 900$i$ passing through the window unit 50 from varying between the feeder 500 and the conveyance unit 200, classification processing of filtering the shape and size may be performed as preprocessing. A shaker conveyor, a vibration screening machine, or a crushing particle-size adjusting machine is used as means for performing preprocessing.

(Window Unit)

The window unit 50 that includes a window member including a window material having translucency in the wavelength region including the visible region, irradiates the sample 900$i$ passing on the passage surface 55 with the primary light containing excited light and collects the secondary light containing the Raman scattered light from the sample 900$i$. A window material selected for the window unit 50 has transparency for passing therethrough the excitation wavelength of the light source 25 to be optically coupled to the light irradiation unit 22 and passing therethrough the secondary light collected by the light collection unit 20. Examples of an employed window material having transparency up to the ultraviolet region include synthetic quartz, low-alkali glass, non-alkali glass, and borosilicate glass.

Meanwhile, the window unit 50 is recognized as a supporting member having a strength and thickness for supporting, from below, the sample 900$i$ passing on the passage surface 55. In other words, the window unit 50 forms a part of the passage path for the sample 900$i$ for carrying out to the conveyance unit 280 the sample 900$i$ that has been carried out from the conveyance unit 200. The window unit 50 is disposed on the downstream side of the conveyance unit 200 in the conveyance direction dc of the conveyance unit 200, and stands still so that its position relative to the light irradiation unit 22 and the light collection unit 20 substantially remains unchanged. The window unit 50 is different from the conveyance units 200 and 280 having a rotating conveyor belt in this point.

The window unit 50 according to the present exemplary embodiment includes the passage surface 55 that is inclined so that the sample 900$i$ slides and slips down from the conveyance unit 200 to the conveyance unit 280. A range of the inclination angle θ (degrees] with respect to the horizontal plane (xy plane), in which the sample 900$i$ substantially remains in contact with the passage surface 55 without rolling thereon is selected for the inclination of the passage surface 55.

When the sample 900$i$ having a mass of m (kg) slides along the passage surface 55, the sample 900$i$ receives a force mg*cos θ in the normal direction of the passage surface 55 and a force mg*sin θ in the direction along the passage surface 55, where θ denotes the inclination angle (degrees) of the passage surface 55 with respect to the horizontal plane, and g denotes the gravitational acceleration (m·second$^{-2}$). More specifically, the passage surface 55 having the inclination angle θ receives a load mg*cos θ[N] related to the mass of the sample 900$i$. The passage surface 55 according to the present exemplary embodiment is inclined with respect to the horizontal plane so that the sample 900$i$ slides along and passes on the passage surface 55.

For the sake of understandability, FIG. 1 illustrates the inclination angle θ as the angle formed by the X-direction reference line corresponding to the horizontal plane and the line B' of the auxiliary parallel lines B and B' which are shifted in the lower right direction from the positions of the passage surface 55 and the light irradiation unit 22 with the positional relation between the passage surface 55 and the light irradiation unit 22 maintained.

The passage surface 55 of the window unit 50 according to the present exemplary embodiment is inclined so that the conveyance speed vs of the sample 900$i$ in the x direction falls in a range between the conveyance speed vc of the conveyance unit 200 and the conveyance speed 2vc of the conveyance unit 280 inclusive. In this case, the sample 900i is conveyed along the passage surface 55 at the conveyance speed vs/cos θ. The conveyance speed vs of the window unit 50 in the x direction is set in consideration of the difference between the acceleration of the sample 900i on the passage surface 55 in the slip-down direction and the deceleration of the sample 900i related to the dynamic frictional resistance between the sample 900i and the passage surface 55, variations in the difference in the sample 900i group, and the conveyance speeds of the conveyance units 200 and 280. When the window unit 50 having the inclined passage surface 55 is referred to as a means for performing a process of passing the sample 900i carried out from the conveyance unit 200 through the passage surface 55 with the sample 900i in contact with the passage surface 55.

Unlike the prior art having a guide for pressing a sample against a slit or reference surface, the identification apparatus 1000 does not have a mechanism for preventing the conveyance of the sample 900i during spectroscopic measurement, making it possible to maintain the constant working distance WD between the light irradiation unit 22 and the passage surface 55. Therefore, the identification apparatus 1000 according to the present exemplary embodiment provides reduced variations in the distance between the light detection surface and the light irradiation unit 22, even if there are variations in size and shape of conveyed samples. More specifically, the identification apparatus 1000 hardly reduces the number of samples to be inspected and processed, and hardly degrades the identification accuracy. More specifically, in the identification apparatus 1000, the passage surface 55 is not provided with a guide for pressing the sample 900i. Therefore, the sample 900i is substantially subjected only to external forces including the gravity, the frictional force of the passage surface 55, and the vibration from a shaking unit, thus smoothly conveying the sample 900i.

According to the present specification, maintaining the constant working distance WD between the passage surface 55 and the light irradiation unit 22 may be referred to as reducing variations in the working distance WD or stabilizing the working distance WD.

For the passage surface 55 of the window unit 50, the friction coefficient for the target sample 900i is selected. The passage surface 55 is subjected to smoothing, hydrophobic treatment, and other processing to prevent the deceleration of the sample 900i by effectively using the inertial force of the sample 900i carried out from the conveyance unit 200, in the conveyance direction dc. The window unit 50 employs a form in which the passage surface 55 contains fluorinated resin containing polyvinylidene fluoride (PVDF). For the passage surface 55 of the window unit 50, the speed of the sample 900i in the conveyance direction dc can be adjusted by using the frictional force with the sample 900i. The passage surface 55 is subjected to surface roughening, hydrophilic treatment, and other processing.

For the region of the passage surface 55 processed for surface reformulation, three different forms of processing are employed. In one form, the processed region is uniformly formed on the surface where the sample 900i passes on. In another form, the processed region is locally formed on the surface. In still another form, a non-processed region is locally formed on the surface. The radiation light spot of the primary light from the light irradiation unit 22 can be subjected to the formation of a region processed for reformulation or the formation of a region unprocessed for reformulation.

Figure 3:
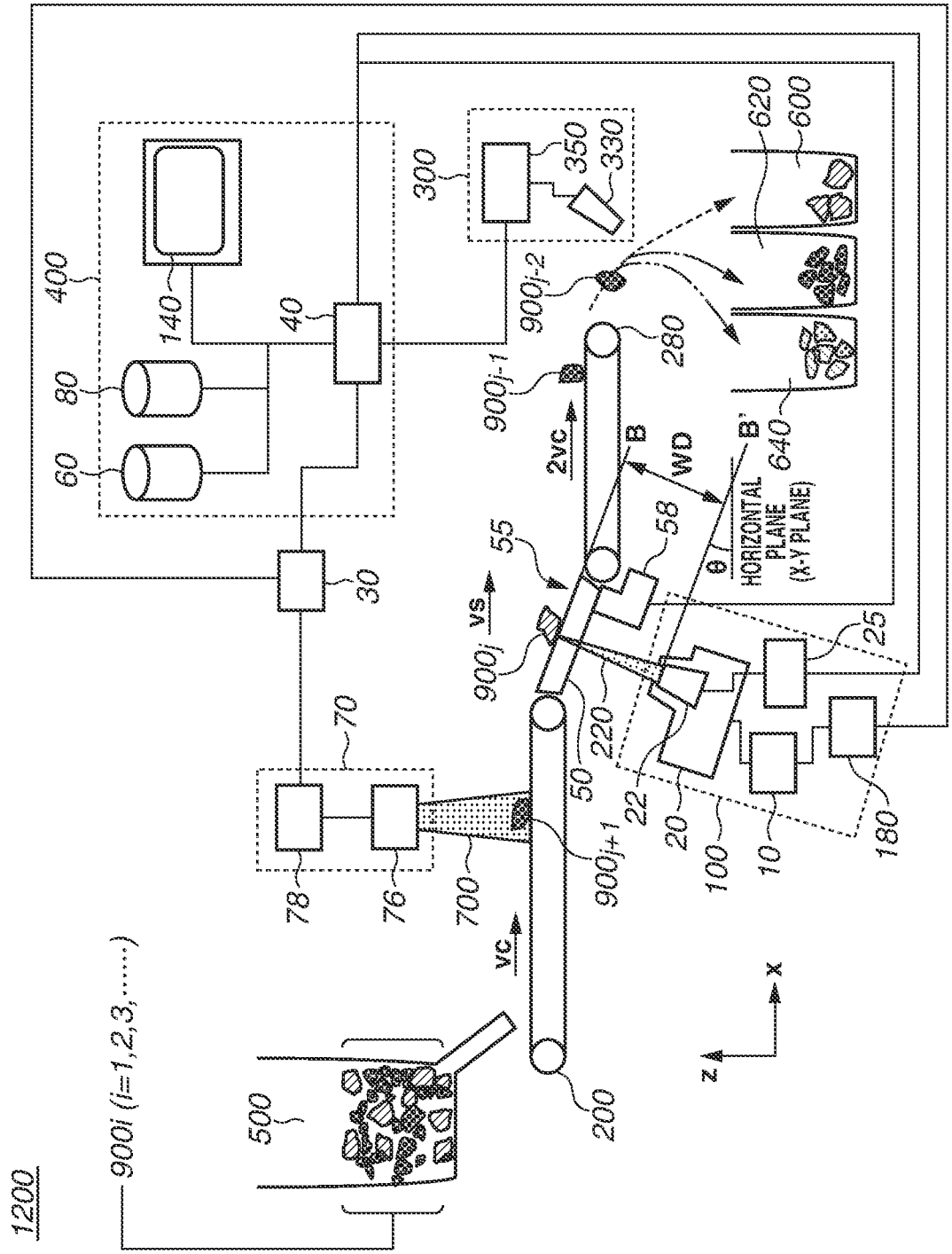
FIG. 3 schematically illustrates a configuration of an identification apparatus according to a second exemplary embodiment of the subject disclosure.

A second exemplary embodiment of the present disclosure will be described blow. An identification apparatus 1200 according to the present exemplary embodiment will be described below with reference to FIG. 3. FIG. 3 schematically illustrates a configuration of the identification apparatus 1200 according to the second exemplary embodiment.

(Identification Apparatus)

The identification apparatus 1200 differs from the identification apparatus 1000 according to the first exemplary embodiment in that there is provided a shaking unit 58 for applying a vibration for assisting the conveyance of the sample 900i on the passage surface 55, to the window unit 50.

Vibrations applied to the window unit 50 by the shaking unit 58 include a linear reciprocating vibration in the xz plane or an elliptic rotational vibration. The linear reciprocating vibration or the elliptic rotational vibration in the xz plane applied by the shaking unit 58 bias the sample 900i in the passage direction dc of the sample 900i. Therefore, the shaking unit 58 is referred to as a biasing unit for biasing the sample 900i in the passage direction (x direction).

In the identification apparatus 1200 having the shaking unit 58, the conveyance speed vsv at which the sample 900i passes through the window unit 50 in the x direction is set to between the conveyance speed vc of the conveyance unit 200 and the conveyance speed 2vc of the conveyance unit 280 inclusive, like the identification apparatus 1000. More specifically, the vibration strength of the shaking unit 58, the inclination angle θ of the passage surface 55, and the average of the friction coefficient between the passage surface 55 and the group of the samples 900i are adjusted so that the conveyance speed vsv of the sample 900i in the x direction is set to between the conveyance speed vc of the conveyance unit 200 and the conveyance speed 2vc of the conveyance unit 280 inclusive.

The amplitude of the passage surface 55 in the working distance direction is set within a range smaller than a thickness variation 36 between samples in the group of the samples 900i (i=1, 2, . . . j−1, j, j+1 . . . ) supplied from the feeder 500 and the coarseness Ra in the samples. With the amplitude in such a range, the working distance WD between the passage surface 55 and the light irradiation unit 22 and the optical distance between the light receiving surface of the sample 900i and the light irradiation unit 22 can be assumed to be substantially constant. More specifically, the window unit 50 can be assumed to stand still so that the position relative to the light irradiation unit 22 and the light collection unit 20 remains unchanged.

Unlike the prior art that has a configuration including a guide for pressing a sample against a slit or reference surface, the identification apparatus 1200 does not have a mechanism for preventing the conveyance of the sample 900i during spectroscopic measurement, making it possible to maintain the constant working distance WD between the light irradiation unit 22 and the passage surface 55. Thus, the identification apparatus 1200 according to the present exemplary embodiment provides reduced variations in the distance between the light detection surface and the light irradiation unit 22, even if there are variations in size and shape of conveyed samples. More specifically, the identification apparatus 1200 hardly reduces the number of samples to be inspected and processed, and hardly degrades the identification accuracy.

The shaking unit 58 according to the present exemplary embodiment can be replaced with other biasing units that apply a biasing force to the conveyance of the sample 900i in the conveyance direction dc and are unlikely to prevent the conveyance of the sample 900i. As another biasing unit, a means for applying a biasing force to the sample 900i in a non-contact way, such as a blowing unit or a charging unit, is employed.

Figure 4:
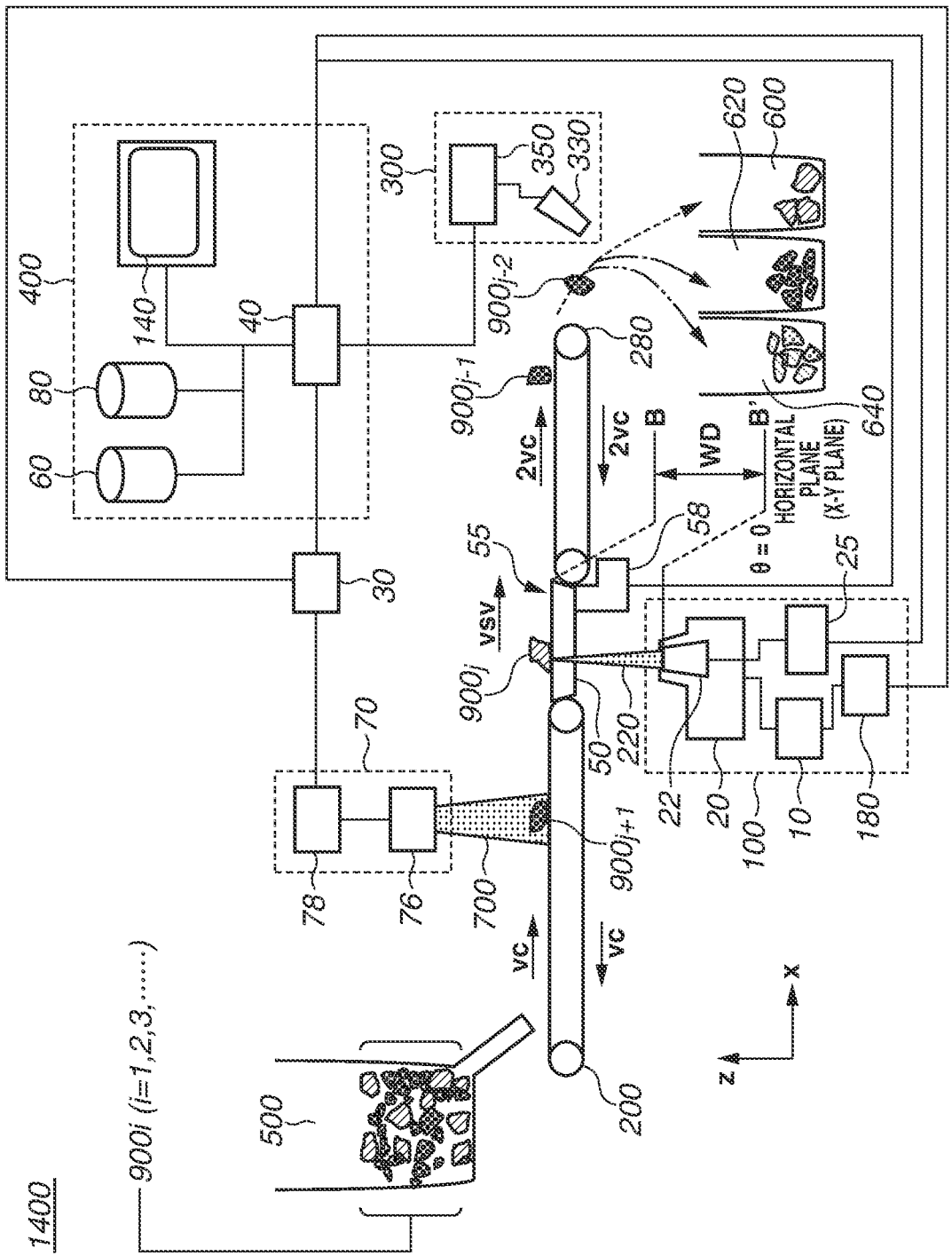
FIG. 4 schematically illustrates a configuration of an identification apparatus according to a third exemplary embodiment of the subject disclosure.

A third exemplary embodiment of the present disclosure will be descried below. An identification apparatus 1400 according to the present exemplary embodiment will be described below with reference to FIG. 4. FIG. 4 schematically illustrates a configuration of the identification apparatus 1400 according to the third exemplary embodiment typically.

(Identification Apparatus)

The identification apparatus 1400 differs from the identification apparatus 1000 according to the first exemplary embodiment in that there is provided the shaking unit 58 for applying a vibration for assisting the conveyance of the sample 900i on the passage surface 55, to the window unit 50, and that the passage surface 55 is horizontally disposed. More specifically, the identification apparatus 1400 differs from the identification apparatus 1200 according to the second exemplary embodiment in that the passage surface 55 is horizontally disposed.

In the identification apparatus 1400 that has the shaking unit 58, the conveyance speed vsv at which the sample 900i passes through the window unit 50 in the x direction is set to between the conveyance speed vc of the conveyance unit 200 and the conveyance speed 2vc of the conveyance unit 280 inclusive, as in the identification apparatus 1000. More specifically, the vibration strength of the shaking unit 58 and the average of the friction coefficients of group of the samples 900i to the passage surface 55 are adjusted so that the conveyance speed vsv of the sample 900i in the x direction is set to between the conveyance speed vc of the conveyance unit 200 and the conveyance speed 2vc of the conveyance unit 280 inclusive.

The shaking unit 58 according to the present exemplary embodiment is configured to subject the passage surface 55 to an elliptic rotational vibration in the clockwise direction on paper in the xz plane. According to the present exemplary embodiment, the amplitude of the passage surface 55 in the working distance direction is set within a range smaller than a thickness variation 36 between samples in the group of the samples 900i (i=1, 2, . . . j−1, j, j+1 . . . ) supplied from the feeder 500 and the coarseness Ra in the samples. The working distance WD between the passage surface 55 and the light irradiation unit 22 and the optical distance between the light receiving surface of the sample 900i and the light irradiation unit 22 can be assumed to be substantially constant. More specifically, the window unit 50 can be assumed to stand still so that the position relative to the light irradiation unit 22 and the light collection unit 20 remains unchanged. In other words, the window unit 50 is statically disposed with respect to the light irradiation unit 22 and the light collection unit 20.

Unlike the prior art that has a configuration including a guide for pressing a sample against a slit or reference surface, the identification apparatus 1400 does not have a mechanism for preventing the conveyance of the sample 900i during spectroscopic measurement, making it possible to maintain the constant working distance WD between the light irradiation unit 22 and the passage surface 55. Therefore, the identification apparatus 1400 according to the present exemplary embodiment provides reduced variations in the distance between the light detection surface and the light irradiation unit 22, even if there are variations in size and shape of conveyed samples. More specifically, the identification apparatus 1400 hardly reduces the number of samples to be inspected and processed, and hardly degrades the identification accuracy.

A fourth exemplary embodiment of the present disclosure will be described below. A part of an identification apparatus 1600 according to the fourth exemplary embodiment will be described below with reference to FIG. 5B. FIG. 5B schematically illustrates a principal part of a configuration of the identification apparatus 1600 according to the fourth exemplary embodiment. FIG. 5B is a plan view illustrating conveyance units 200w and 280w, a window unit 50w, and an air nozzle 330MN of the identification apparatus 1600 when viewed in the z direction from the plane A-A' illustrated in FIG. 1.

(Identification Apparatus)

As illustrated in FIG. 5B, the identification apparatus 1600 differs from the identification apparatus 1000 illustrated in FIG. 5A in that there are provided four different supply ports of the feeder 500, four different imaging fields of the camera 76, four different irradiation spots from the light irradiation unit 22, and four different air nozzles of the discrimination apparatus 300 disposed in the sub conveyance direction. The identification apparatus 1600 according to the fourth exemplary embodiment is an extended-width version of the identification apparatus 1000. More specifically, the identification apparatus 1600 is a multi-row identification apparatus including the conveyance units 200w and 280w, the window unit 5w, and a plurality of identification units disposed at different positions in the sub conveyance direction perpendicularly intersecting the conveyance direction dc. The identification apparatus 1600 provides a higher system integration degree and a higher identification processing speed than the identification apparatus 1000.

The identification apparatus 1600 includes four different conveyance tracks TRk (k=1 to 4). For each track TRk, a supply region 550-k for a sample 900i, an imaging field 700-k, a primary light irradiation spot 220-k, and an air nozzle 330-k are serially disposed.

In the multi-row configuration of the identification apparatus 1600, elements to be disposed at different positions in the sub conveyance direction of the conveyance units 200 and 280 may be disposed in an independent way or in an array form. The identification apparatus 1600 includes a feeder 500A having an arrayed supply port, and a multi-discrimination apparatus 300MN having the air nozzle 330-k in a multi-nozzle form.

Unlike the prior art that has a configuration including a guide for pressing a sample against a slit or reference surface, the identification apparatus 1600 does not have a mechanism for preventing the conveyance of the sample 900i during spectroscopic measurement, making it possible to maintain the constant working distance WD between the light irradiation unit 22 and the passage surface 55. Thus, the identification apparatus 1600 according to the present exemplary embodiment provides reduced variations in the distance between the light detection surface and the light irradiation unit 22, even if there are variations in size and shape of conveyed samples. More specifically, the identification apparatus 1600 hardly reduces the number of samples to be inspected and processed, and hardly degrades the identification accuracy.

The identification apparatus 1600 according to the present exemplary embodiment enables inspection tracks to share a window unit 50W and therefore, unlike the prior art where slits are provided in the conveyor belt, has an advantage of being free from such limitations as the reduced strength of the conveyance units configured in a multi-row form and the reduced operation speed of the conveyor belt.

In the identification apparatus 1600, the sample 900*i* is substantially subjected only to external forces including the gravity, the frictional force of the passage surface 55, and the vibration from the shaking unit. Since the identification apparatus 1600 does not include a guide mechanism for pressing the sample 900*i* against the window unit 50, there is no possibility that the sample 900*i* is caught by the guide mechanism. Thus, unlike the prior art that has a configuration including a guide mechanism for pressing the sample 900*i* against the reference surface in the sub conveyance direction, the identification apparatus 1600 having the multi-row configuration is expected to increase the number of samples to be inspected and processed per unit time.

The prior art that includes a guide mechanism makes it necessary to dispose a plurality of sets of <a guide mechanism, a light transmitting plate, an irradiation optical system, and a light collection optical system sequentially disposed in the sub conveyance direction> at different positions in the sub conveyance direction, resulting in a redundant and bulky identification apparatus. By contrast, the identification apparatus 1600 according to the present exemplary embodiment enables the conveyance tracks to share the window unit 50 and implements the multi-row configuration only with a space for disposing optical systems in the sub conveyance direction without requiring a guide mechanism.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-109438, filed Jun. 25, 2020, which is hereby incorporated by reference herein in its entirety.

What is claimed is:

1. An identification apparatus comprising:
    a window unit including a passage surface on an upper side configured to allow a sample supplied from a conveyance unit to be moved slidably on the passage surface;
    a light irradiation unit disposed below the window unit, spaced a certain distance from the passage surface, and configured to irradiate the sample with a primary light through the window unit;
    a light collection unit disposed below the window unit and configured to collect a secondary light from the sample through the window unit; and
    an acquisition unit configured to acquire identification information for identifying a property of the sample based on the secondary light collected by the light collection unit,
    wherein the window unit has an optical translucency configured to allow the sample to be irradiated with the primary light from the light irradiation unit, and
    wherein the passage surface of the window unit is a specific working distance spaced apart from the light irradiation unit.

2. The identification apparatus according to claim 1, wherein the window unit stands still so that a position of the window unit relative to each of the light irradiation unit and the light collection unit remains unchanged.

3. The identification apparatus according to claim 1, wherein the window unit is disposed on a downstream side of the conveyance unit in a conveyance direction.

4. The identification apparatus according to claim 1, wherein the window unit supports, from below, the sample that is passing on the passage surface.

5. The identification apparatus according to claim 1, wherein the passage surface of the window unit is configured to receive a load related to a mass of the sample.

6. The identification apparatus according to claim 1, wherein the passage surface is inclined with respect to a horizontal plane to pass the sample in a certain passage direction with the sample sliding.

7. The identification apparatus according to claim 6, wherein a plurality of the light collection units is disposed at different positions in a direction intersecting the certain passage direction.

8. The identification apparatus according to claim 1, further comprising a biasing unit configured to bias the sample in a certain passage direction.

9. The identification apparatus according to claim 8, wherein the biasing unit includes a shaking unit configured to apply a vibration to the window unit and assist the conveyance of the sample on the passage surface.

10. The identification apparatus according to claim 1, further comprising an image acquisition unit configured to acquire spectral information for the sample based on a spectral element configured to spectrally disperse the light collected by the light collection unit, an imaging device configured to acquire a spectral image spectrally dispersed by the spectral element, and the spectral image.

11. The identification apparatus according to claim 10, further comprising an information reference unit configured to acquire material information for the sample based on the spectral information.

12. The identification apparatus according to claim 1, wherein the acquisition unit acquires the identification information for identifying the property of the sample based on a Raman spectrum contained in the secondary light.

13. The identification apparatus according to claim 1, further comprising an imaging unit configured to capture an image of the sample.

14. The identification apparatus according to claim 13, wherein the acquisition unit identifies the property of the sample based on the image of the sample acquired from the imaging unit and a Raman spectrum contained in the secondary light.

15. The identification apparatus according to claim 1, further comprising the conveyance unit.

16. The identification apparatus according to claim 1, further comprising an instruction unit configured to issue a discrimination operation instruction to a discrimination apparatus that discriminates the sample, based on the identification information acquired by the acquisition unit.

17. The identification apparatus according to claim 16, further comprising the discrimination apparatus.

18. The identification apparatus according to claim 1, wherein the window unit has translucency to the secondary light.

19. The identification apparatus according to claim 1, wherein the identification information includes information for identifying whether the sample is a target sample.

20. The identification apparatus according to claim 1, wherein the light irradiation unit includes an objective lens configured to define a focal distance.

21. An identification method comprising:
    passing a sample supplied from a conveyance unit on a passage surface on an upper side of a window unit and sliding the sample in contact with the passage surface;

irradiating, through the window unit, the sample with a primary light from a light irradiation unit disposed a specific working distance distant from the passage surface of the window unit having a translucency for the primary light;

collecting a secondary light from the sample through the window unit; and identifying a property of the sample based on the collected secondary light.

22. An identification apparatus comprising:

a window unit including a passage surface on an upper side configured to allow a sample supplied from a conveyance unit to be moved slidably on the passage surface;

a light irradiation unit disposed below the window unit, and configured to irradiate the sample with a primary light through the window unit;

a light collection unit disposed below the window unit and configured to collect a secondary light from the sample through the window unit;

an acquisition unit configured to acquire identification information for identifying a property of the sample based on the secondary light collected by the light collection unit; and an instruction unit configured to issue a discrimination operation instruction to a discrimination apparatus that discriminates the sample, based on the identification information acquired by the acquisition unit.

* * * * *